Nov. 15, 1966   J. E. WALDRUM   3,285,516
VIBRATING SPRAY DEVICE
Filed Aug. 10, 1964   3 Sheets-Sheet 3
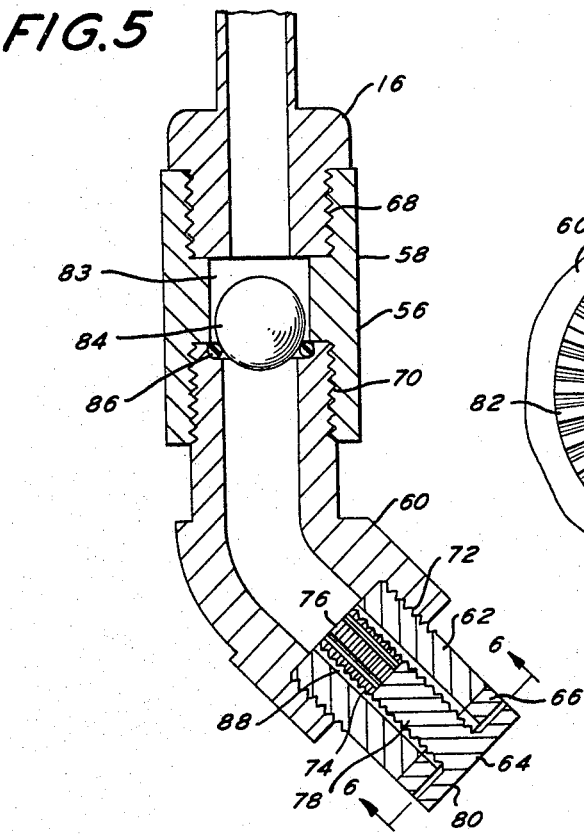
FIG.5
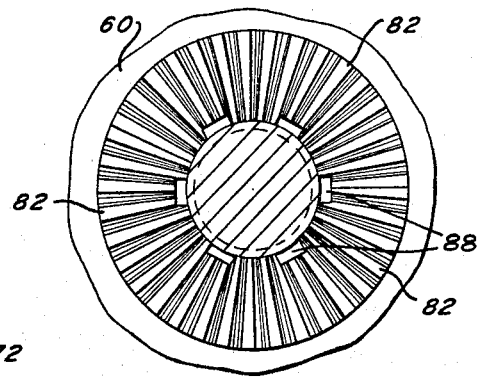
FIG.6
FIG.7
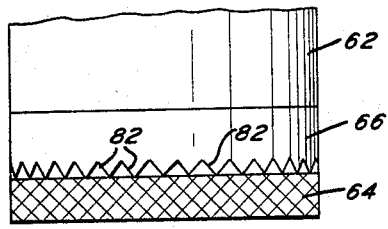
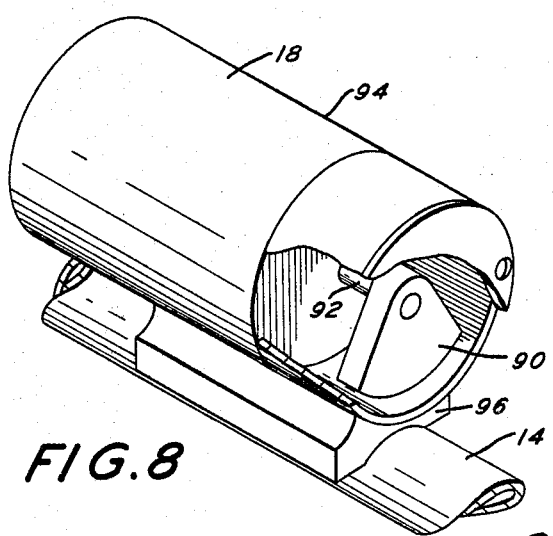
FIG.8
INVENTOR.
JOHN E. WALDRUM
BY
Caesar and Rivise
ATTORNEYS.

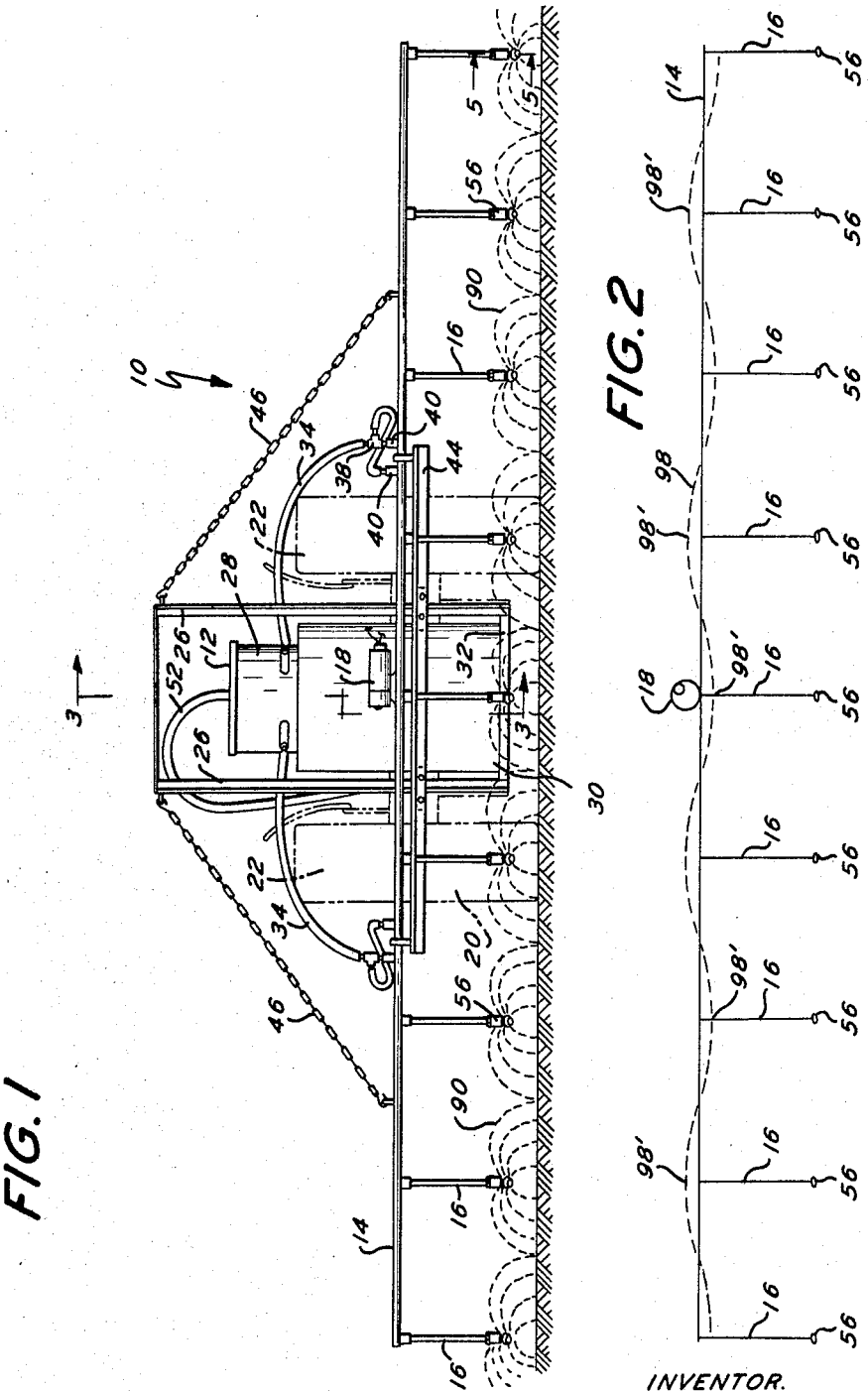

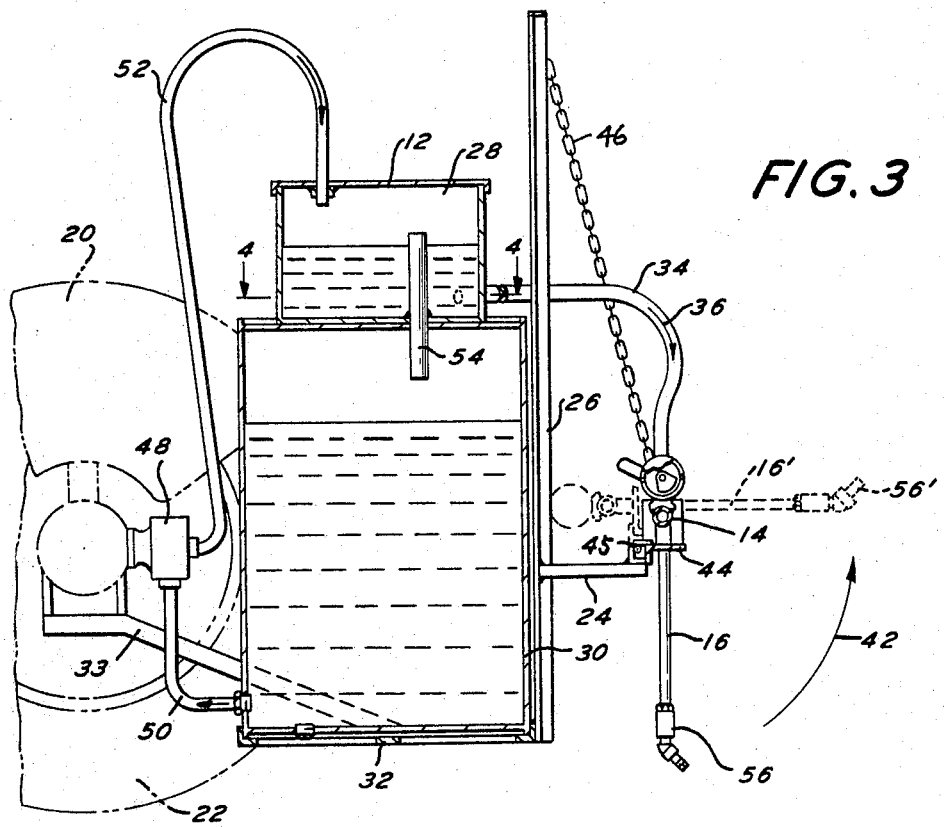
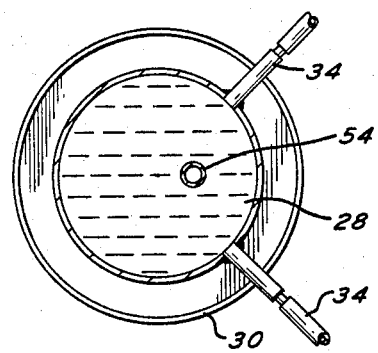

United States Patent Office 3,285,516
Patented Nov. 15, 1966

3,285,516
VIBRATING SPRAY DEVICE
John E. Waldrum, Ambler, Pa., assignor to Amchem Products, Inc., Ambler, Pa., a corporation of Delaware
Filed Aug. 10, 1964, Ser. No. 388,532
5 Claims. (Cl. 239—102)

This invention relates to a vibrating spray device and has as its principal objective the provision of a new class of spray devices that achieves a remarkable uniformity of liquid spray particle size in the operation thereof.

It is well known to apply herbicides to an area to be treated by formulating the same as a sprayable liquid and then applying the same to the locus in question. Devices utilized to apply such herbicidal formulations generally required in addition to the necessary piping, a source of pressure, such as a pump, and a spray nozzle in order to achieve a desired distribution pattern of the herbicidal formulation. An example of pressurized sprayers heretofore used is the boom sprayer. This sprayer was generally mounted upon the rear of a tractor with the pumping force being generated by power directly obtained from the tractor.

The boom sprayers heretofore used have generally proved to be satisfactory in applying a herbicidal formulation to a desired area on a commercial scale.

However, where systemic herbicides, such as, 2,4-dichlorophenoxyacetic acid or 2,4,5-trichlorophenoxyacetic acid and their many derivatives are involved, the spray patterns achieved through the use of the conventional boom sprayer has created problems. This occurred because there is a tendency on the part of conventional boom sprayers to create a spray pattern which contains a significant amount of fine particles. The fine particles have a tendency to be caught in air currents and thereby carried to a place somewhat removed from the desired area of application. This phenomenon is known as "drift," and is particularly dangerous where systemic herbicides are involved. This is because it takes but a few drops of a systemic herbicide to kill a plant as distinguished from the older type herbicides which are generally known as "contact" herbicides where large quantities were required. However, even a few drops of a systemic herbicide quickly find their way into the circulatory system of a plant to exert a hormone action which literally causes the plant to kill itself.

In utilizing conventional boom sprayers, it has been determined by the present inventor that "drift" can be minimized when the proportions of fine particles is held small by maintaining the pressure of spraying at a low level. However, this will have the effect of drastically lowering the amount of material that is being applied by the conventional boom sprayer at any given time. Should the pumping or spraying pressure be increased, the amount of material being applied will be correspondingly increased. However, there will be an appreciably greater amount of fine particles produced as the spraying pressure is increased, and this has a definite tendency to increase the likelihood of "drift."

It is therefore an object of the present invention to provide a vibrating spray device wherein the spray pattern is composed of particles of amazingly uniform size, but which can simply be adjusted to another desired uniform size.

Still another object of the present invention is to provide a vibrating spray device wherein the spray pattern is essentially composed of spray particles of a desired size and wherein the number of fine particles generated is quite small.

Yet another object of the present invention is to provide a vibrating spray device producing spray particles of a desired size, and wherein the amount of material being sprayed is not necessarily dependent upon a high degree of pressure being applied by a pump or similar device.

Still another object of the present invention is to provide a vibrating spray device constructed of conventional parts or from existing equipment such that the erectional and maintenance costs of the device are relatively low.

Yet another object of the present invention is to provide a vibratory spray device of general application not only for use with herbicidal liquids, but also for use with liquids in general where uniform drop size is desired.

The foregoing as well as other objects of the invention are achieved by providing a vibrating spray device which includes a source of liquid supply leading to a distributional manifold preferably including several spray nozzles. In the preferred form of the invention, gravity flow is utilized. However, it is contemplated to use a pumping pressure under certain conditions, although, it is generally preferred to increase the spray rate in accordance with the present invention by further elevation of the liquid supply or through the increase of nozzle opening.

The present invention rests upon the discovery that a vibrational source of power may be utilized to place the entire spray unit in a state of mechanical resonance. While the applicant does not wish to be bound to any particular theory as to the operation of the present invention, it is believed that when the vibrating spray device of the present invention is placed in a state of resonance, the liquid contained therein, and particularly the liquid approaching the nozzles thereof, is also placed in a state of resonance or certainly in a high degree of frenzy. It is preferred that the nozzles be situated at the points of greatest amplitude (anti-nodes) in order that the maximum benefits may be achieved from the resonant state.

It is further theorized that since power is most efficiently transferred to or from a system when it is at resonance, as in an analogy to electrical principles, it is most easy to transfer the vibrational power to the spray system in the resonant state to the liquid that is being ejected therefrom. A vibrating means utilizable with the present invention consists essentially of an eccentric flywheel that is attached to the sprayer pipe boom.

In view of all of the foregoing, it has been determined that with the vibrating spray device of the present invention, the use of a pump for pressurizing the liquid to be sprayed can be dispensed with. Instead, the present invention relies upon the combination of the vibrational forces emanating from vibrating means of the present spray device in conjunction with a modest gravity feed. However, a pumping action may be used with the present spray device so long as the pumping pressure is not so great as to begin to introduce an appreciable amount of fine particles in the spray pattern.

The spray nozzles preferably utilized with the present invention comprise an area of circumferentially disposed discharge openings. Each spray nozzle will be closed when the assembly is not vibrating through the action of a ball which, when seated on an O-ring, closes the nozzle opening. When the vibrating begins the ball will be unseated from the O-ring and thus liquid may flow through the nozzles. As soon as the vibrating ceases, the ball will seat again immediately and thereby prevent further spraying of the herbicidal formulation until the vibration is initiated.

Other objects and many of the attendant advantages of this invention will be readily appreciated as the same becomes better understood by reference to the following detailed description when considered in connection with the accompanying drawings wherein:

FIG. 1 is a front elevational view of a vibrating spray device embodying the present invention secured to the rear of a tractor;

FIG. 2 is a diagrammatic view showing the disposition of the drop nozzles of the present invention at the points of greatest amplitude (anti-nodes);

FIG. 3 is a fragmentary enlarged sectional view taken along the lines 3—3 of FIG. 1 with portions thereof shown in phantom for the sake of clarity;

FIG. 4 is a sectional view taken along the lines 4—4 of FIG. 3;

FIG. 5 is an enlarged fragmentary longitudinal sectional view taken through one of the nozzle assemblies at the valve end of one of the drop nozzles of FIG. 1;

FIG. 6 is an enlarged sectional view taken along the lines 6—6 of FIG. 5;

FIG. 7 is an enlarged fragmentary detail elevational view of the extreme tip of the nozzle assembly of FIG. 5; and FIG. 8 is an enlarged perspective view with portions broken away for the sake of clarity of a vibrator motor that is utilizable with the present invention.

Referring now in greater detail to the various figures of the drawing wherein like reference characters refer to like parts, a vibrating spray device embodying the present invention is shown at 10 in FIG. 1. The device 10 essentially consists of liquid supply means 12, pipe boom 14, drop nozzles 16 and vibrator motor 18. As shown in FIG. 1, the entire assembly 10 is mounted upon tractor 20 with the tires 22 thereof being shown in phantom. The assembly 10 is secured to the tractor 20 by means of arms 24 which are welded to uprights 26 as shown in FIG. 3. The uprights 26 are in turn bolted or otherwise secured to the frame of the tractor 20.

The liquid supply means 12 are best shown in FIG. 3 as comprising upper feeder tank 28 and lower storage tank 30, the latter being mounted upon a base 32 which extends from the uprights 26. Further support is also obtained from braces 33 bolted adjacent the axle of the tractor 20 as shown in FIG. 3.

As shown in FIG. 3, the herbicidal formulation passes by gravity flow through hoses 34 downwardly in the direction of arrows 36 to a T connection 38 (FIG. 1) from which the herbicidal formulation passes to entrance ports 40 and then into the pipe boom 14.

The pipe boom 14 may be a twelve foot run of ¾-inch steel pipe that is closed at both ends but has the drop nozzles 16 extending therefrom. The drop nozzles 16 are of ¼ inch pipe and may be held either in the vertical full line position of FIG. 3 or in the horizontal phantom position of FIG. 3 for pivoting in the direction of arrow 42. Certain of the drop nozzles 16, as shown in FIGS. 1 and 3, pass through a horizontally disposed rail 44 which is hingedly connected to the arms 24 by hinge means 45. As shown in FIG. 3, the drop nozzles may simply be positioned in either the vertical or horizontal positions as desired. As shown in FIG. 1, the assembly is further stabilized by chain supports 46 having one end secured to the pipe boom 14 and the other end secured to an upright 26.

As previously stated, the herbicidal formulation is fed to the pipe boom 14 by a gravity feed from feeder tank 28. While it would be possible to elevate the entire supply of herbicidal formulation, a much more efficient and satisfactory arrangement is achieved by using recirculating pump 48 which is operated from the tractor. Thus, pump 48 will cause liquid to flow in a recirculating pattern from lower storage tank 30 through inlet pipe 50 and then discharge pipe 52 into feeder tank 28. As further shown in FIG. 3, certain of the herbicidal liquid will flow to the pipe boom 14 through hoses 34 while the remainder of the liquid will return to storage tank 30 through overflow pipe 54. It will also be seen that the feeder tank 28 will function as a constant head tank since the level of liquid in the feeder tank 28 will not exceed the upper end of the overflow pipe 54 and will not drop below the height of the inlet to the hoses 34.

Each of the drop nozzles 16 are equipped with a nozzle assembly 56 as shown in greater detail in FIGS. 5, 6 and 7. The nozzle assembly 56 includes valve seat 58, discharge connection 60, discharge link 62, plug 64 and disc 66. The valve seat 58 is generally H-shaped and includes upper female threads 68 for mating with complementary threads of drop nozzle 16 and lower female threads 70 for mating with the inward threads of discharge connection 60.

The discharge connection 60 possesses female threads 72 which receive the threads of the discharge link 62. The discharge link 62 possesses a threaded internal bore 74 which receives the threaded head 76 of the plug 64. As shown in FIG. 5, the head 76 is integral with a stem 78 which terminates in integral end 80 of the plug 64.

As further shown in FIG. 5, a disc 66 possessing many radial discharge ports 82 of substantially equal size is secured against the outer face of the discharge link 62 by pressure applied through the tightening of the end 80 of the plug 64 so that the disc 66 is sandwiched between the end 80 and the end surface of the discharge link 62.

As shown in FIG. 5, the valve seat 58 possesses a hollow internal area 83 that receives ball 84 which is adapted to be seated in a closed position against a sealing O-ring 86.

When the motor 18 vibrates, the ball 84 is unseated from its closed position on the O-ring 86 by virtue of the vibrational forces emanating from the motor 18. Hence, the motor 18 not only places the spraying apparatus 10 in a state of resonance, as will be discussed hereinafter, but it also causes the nozzle assembly 56 through movement of ball 84 to open to permit the spraying to proceed.

When the nozzle assembly 56 is open, the herbicidal formulation may pass between the ball 84 and the O-ring 86 through discharge connection 60, and then through the head 76 by passing in slots 88 (FIG. 5) formed therein. Alternatively, the head 76 may have a bore which extends through stem 78 and then through a boss in the base of stem 78.

The liquid then passes within discharge link 62 and is finally discharged from the nozzle assembly through discharge ports 82 in a spray pattern 90.

Should it be desired to change the size of the drops emanating from the nozzle assembly 56, it is a simple matter to substitute a disc 66 having discharge ports of a different substantially equal size or different shape or spacing. However, the droplets of the new size obtained from the substitution of the new disc 66 will tend to be substantially uniform in size due to the vibrating action of the spray device 10.

The vibrator motor 10 is shown in detail in FIG. 8 and consists of a D.C. motor having an eccentric 90 mounted upon a shaft 92. The D.C. motor is contained in housing 94 which is positioned upon a mounting 96 that is secured to the pipe boom 14. Hence, the vibrations obtained through the rotation of the eccentric 90 are immediately transmitted through the mounting 96 to the pipe boom 14 thereby causing the entire spray device 10 to vibrate in resonance when shaft 92 is driven with sufficient speed.

In order to determine the natural resonance of the given piece of equipment, it is a simple matter to strike the pipe boom 14 with a hammer and then use a stroboscope to determine the resonance at which the pipe boom vibrates. Once this is determined, it is a simple matter to select a vibrator motor to give the desired period of resonance. The actual frequency of the vibrations given off by the motor actually need not be critical so long as it gives off vibrations at a frequency near the natural resonance of the equipment. This is because when the equipment is subjected to vibrations near its period of natural resonance, the equipment will tend to go into resonance, and will tend to remain in its natural resonance even if the vibrational frequency of the motor 18 is changed over a fairly wide range.

This is because a body at resonance tends to stay in resonance and also because a body has but one natural frequency of vibration. However, it is also recognized that a body will behave as if it is vibrating at resonance in exact multiples of the natural period of resonance. Hence, it is recognized that once the period of natural resonance is known, the vibrational motor may impart sufficient vibration to the spray device 10 so that it will vibrate at, for instance, twice its period of natural resonance or three times its period of natural resonance. However, it is generally preferred that the spray device 10 vibrates at its natural resonance.

It is also contemplated that intermediate vibrational frequencies other than the resonant frequency or exact multiples thereof including frequencies below the basic natural resonance may be employed, although it is preferred that the natural resonant frequency be employed. However, it is essential in using such other frequency that there be a substantial uniformity of droplet size.

In one embodiment of the present invention, it was discovered that the vibrator motor 18 should operate at a frequency of 3,240 cycles per minute, and when this is done the equipment will vibrate at resonance. However, the present invention is not confined to any particular frequency of vibration, but it is to be emphasized that the preferred frequency of vibration to be imparted to the spray equipment depends solely upon the equipment's natural frequency of vibration which can be determined by a stroboscope as previously discussed. Hence, it is possible that spray equipment can be designed to have natural frequency of resonance as low as 100 oscillations per minute and as high as 12,000 oscillations per minute with a given piece of equipment usually having but one basic natural resonant vibration.

In one working model of the present invention it was determined that where the vibrator motor operated at a rate of 30,240 cycles per minute, the vertibal amplitude imparted to the pipe boom 14 was plus or minus 1/16 of an inch. As shown in FIG. 2, the operation of the spray device of the present invention may be improved by placing the drop nozzle 16 at the points of greatest amplitude (anti-nodes). FIG. 2, actually illustrates the disposition of the amplitude of the vibrational forces imparted to the pipe boom 14 by the vibrator motor 18. This is shown in the dashed line 98. It is to be noted that the drop nozzles 16 are preferably located at the minimum and maximum points 98 (anti-nodes) of the dashed line or curve 98.

It is thus seen that the vibration imparted to the spray device 10 is such that it will be in a state of mechanical resonance. When this happens, the droplets emerging from discharge port 82 are amazingly uniform in size. Hence, droplets of an extremely fine size can be essentially eliminated from the spray pattern and thus the problem of "drift" is substantially eliminated through the operation of the present invention.

Furthermore, the vibrating spray device of the present invention may have general application not only for use with herbicidal liquids, but also for use with liquids in general where uniform drop size is desired.

Obviously, many modifications and variations of the present invention are possible in the light of the above teachings. It is, therefore, to be understood that within the scope of the appended claims, the invention may be practiced otherwise than as specifically described.

What is claimed as the invention is:

1. A vibrating spray device comprising a source of liquid supply and a pipe boom with at least one nozzle assembly extending therefrom, connecting means permitting liquid supply to be conveyed to said pipe boom, thereafter to be discharged through said nozzle assembly, and vibrating means operatively associated with said pipe boom whereby said pipe boom will be caused to vibrate to an extent sufficient that the droplets emerging from said nozzle assembly will be essentially of a uniform size, said nozzle being a drop nozzle which in one position will lie generally in a horizontal plane and which in another position will lie generally in a vertical plane.

2. A vibrating spray device comprising a source of liquid supply and a pipe boom with at least one nozzle assembly extending therefrom, connecting means permitting liquid supply to be conveyed to said pipe boom, thereafter to be discharged through said nozzle assembly, and vibrating means operatively associated with said pipe boom whereby said pipe boom will be caused to vibrate to an extent sufficient that the droplets emerging from said nozzle assembly will be essentially of a uniform size, said nozzle assembly further including a valve seat normally closed by ball means whereby when said pipe boom is caused to vibrate, said ball means will be unseated thereby from its closed position to permit the discharge of liquid through said nozzle assembly.

3. A vibrating spray device comprising a source of liquid supply and a pipe boom with at least one nozzle assembly extending therefrom, connecting means permitting liquid supply to be conveyed to said pipe boom, thereafter to be discharged through said nozzle assembly, and vibrating means operatively associated with said pipe boom whereby said pipe boom will be caused to vibrate to an extent sufficient that the droplets emerging from said nozzle assembly will be essentially of a uniform size, said nozzle assembly further including a replaceable disc having radial discharge ports of substantially uniform size, and wherein said pipe boom is caused to vibrate at its natural resonance.

4. A vibrating spray device comprising a source of liquid supply and a pipe boom with at least one nozzle assembly extending therefrom, connecting means permitting liquid supply to be conveyed to said pipe boom, thereafter to be discharged through said nozzle assembly, and vibrating means operatively associated with said pipe boom whereby said pipe boom will be caused to vibrate to an extent sufficient that the droplets emerging from said nozzle assembly will be essentially of a uniform size, said source of liquid supply comprising an upper feeder tank and a lower storage tank, overflow means connecting said upper and lower tanks, said connecting means including hose means connecting said upper tank to said pipe boom, and pump means to recirculate said liquid supply from said lower tank to said upper tank, said overflow means permitting certain of the liquid to return to said lower tank.

5. The invention of claim 4 wherein said vibrating means are set to vibrate said device at substantially its natural resonance.

References Cited by the Examiner

UNITED STATES PATENTS

| Re. 25,744 | 3/1965 | Drayer | 239—4 |
|---|---|---|---|
| 1,992,490 | 2/1935 | Lewis | 239—572 |
| 3,123,305 | 3/1964 | Eisenkraft | 239—4 |
| 3,168,595 | 2/1965 | Kibber | 239—4 |

FOREIGN PATENTS

| 1,264,220 | 5/1961 | France. |
|---|---|---|
| 436,502 | 11/1926 | Germany. |
| 218,925 | 12/1958 | Great Britain. |

EVERETT W. KIRBY, *Primary Examiner.*